US010280828B2

(12) United States Patent
Light

(10) Patent No.: US 10,280,828 B2
(45) Date of Patent: May 7, 2019

(54) VERY LOW WATER HEAT TRANSFER FLUID WITH REDUCED LOW TEMPERATURE VISCOSITY

(71) Applicant: Evans Cooling Systems, Inc., Suffield, CT (US)

(72) Inventor: J Thomas Light, Lakeville, CT (US)

(73) Assignee: EVANS COOLING SYSTEMS, INC., Suffield, CT (US)

( * ) Notice: Subject to any disclaimer, the term of this patent is extended or adjusted under 35 U.S.C. 154(b) by 0 days.

(21) Appl. No.: 15/148,306

(22) Filed: May 6, 2016

(65) Prior Publication Data

US 2016/0326940 A1  Nov. 10, 2016

Related U.S. Application Data

(60) Provisional application No. 62/158,262, filed on May 7, 2015, provisional application No. 62/158,338, filed on May 7, 2015.

(51) Int. Cl.
| | | |
|---|---|---|
| *F01P 3/00* | (2006.01) | |
| *C09K 5/20* | (2006.01) | |
| *C09K 5/10* | (2006.01) | |

(52) U.S. Cl.
CPC ............................. *F01P 3/00* (2013.01); *C09K 5/10* (2013.01); *C09K 5/20* (2013.01); *F01P 2003/003* (2013.01)

(58) Field of Classification Search
CPC .. F01P 3/00; F01P 2003/003; F01P 2003/001; F01P 2025/80; C09K 5/10; C09K 5/20; C09K 3/18
USPC ...................................................... 123/41.42
See application file for complete search history.

(56) References Cited

U.S. PATENT DOCUMENTS

| 4,452,715 A | 6/1984 | Hirozawa |
| 5,118,434 A * | 6/1992 | Meyer ................... C09K 3/18 |
| | | 210/701 |
| 7,387,748 B2 * | 6/2008 | Pellet ..................... C09K 5/20 |
| | | 252/73 |

(Continued)

FOREIGN PATENT DOCUMENTS

| CN | 101402848 A | 4/2009 | |
| CN | 101671549 | * 3/2010 | ............... C09K 5/10 |

(Continued)

OTHER PUBLICATIONS

DOW Heat Transfer Fluids, DOWCOW 100, Jan. 13, 2013 [see attached PDF].*

(Continued)

*Primary Examiner* — Hung Q Nguyen
*Assistant Examiner* — Anthony Donald Taylor, Jr.
(74) *Attorney, Agent, or Firm* — McCarter & English, LLP

(57) ABSTRACT

A very low water (VLW) heat transfer fluid, having an atmospheric boiling point of about 148° C. (about 300° F.) and a low temperature operating limit (LTOL) of −40° C., or below, comprised of one or more polyhydric alcohols, one or more corrosion inhibitors, and between 5% and 10% water. The heat transfer fluid retains many of the features of a non-aqueous heat transfer fluid, while providing a substantially lower viscosity. The heat transfer fluid is suitable for use in internal combustion engines as an engine coolant and in other heat transfer applications.

3 Claims, 8 Drawing Sheets

EG with PDO, Water, and Corrosion Inhibitors.
Water is 6% of total mass
PDO is 14% of total mass
Does Not Supercool

(56) References Cited

U.S. PATENT DOCUMENTS

| | | | |
|---|---|---|---|
| 7,655,154 B2 * | 2/2010 | Evans | C09K 5/10 |
| | | | 252/67 |
| 8,617,415 B2 * | 12/2013 | Yang | C09K 5/20 |
| | | | 252/68 |
| 2002/0171063 A1 * | 11/2002 | Evans | C09K 3/185 |
| | | | 252/70 |
| 2003/0047708 A1 | 3/2003 | Eaton et al. | |
| 2006/0163529 A1 * | 7/2006 | Jokinen | C09K 5/10 |
| | | | 252/73 |
| 2008/0048147 A1 | 2/2008 | Eaton | |
| 2008/0061269 A1 | 3/2008 | Evans et al. | |
| 2008/0315152 A1 | 12/2008 | Daly | |

FOREIGN PATENT DOCUMENTS

| | | | | |
|---|---|---|---|---|
| CN | 102002347 | * | 4/2011 | C09K 5/20 |
| CN | 102367379 | * | 3/2012 | C09K 5/20 |
| CN | 103059819 | * | 4/2013 | C09K 5/20 |
| WO | 8909806 A1 | | 10/1989 | |
| WO | 2015153652 A1 | | 10/2015 | |

OTHER PUBLICATIONS

International Search Report and Written Opinion for Application No. PCT/US2016/031195, dated Aug. 12, 2016, 7 pages.

* cited by examiner

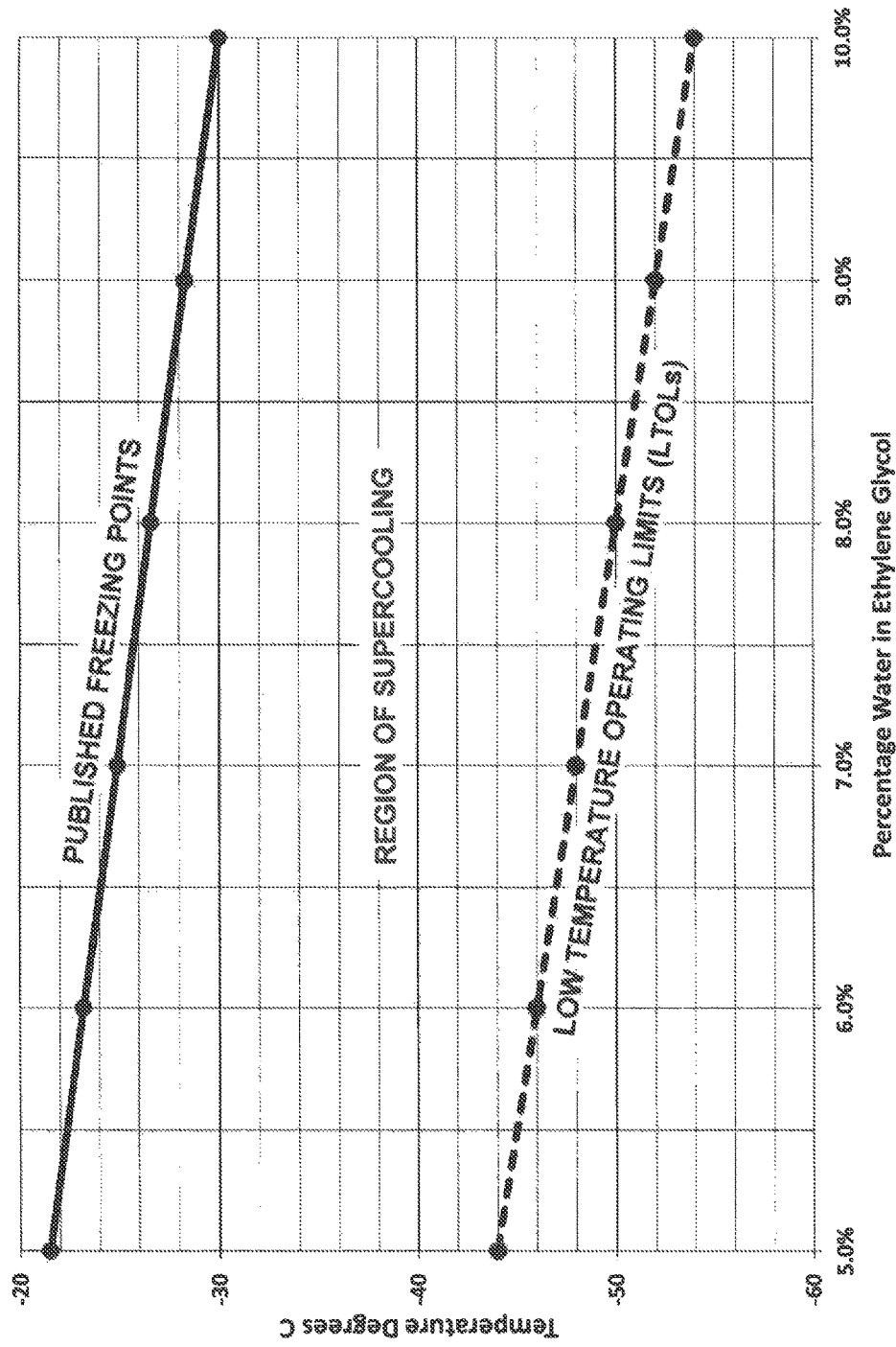

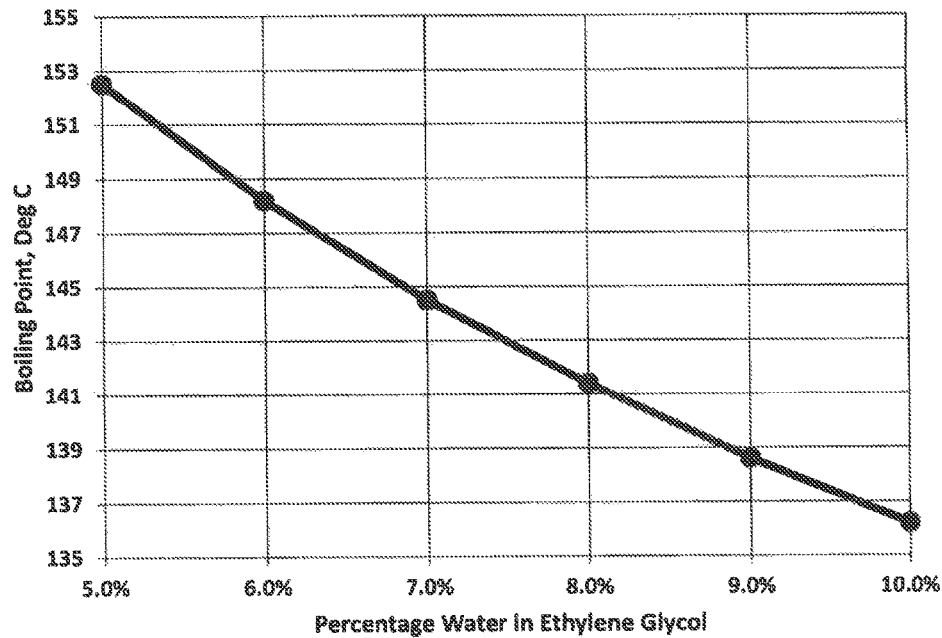
Figure 4  Boiling Point of Ethylene Glycol vs. Water Content
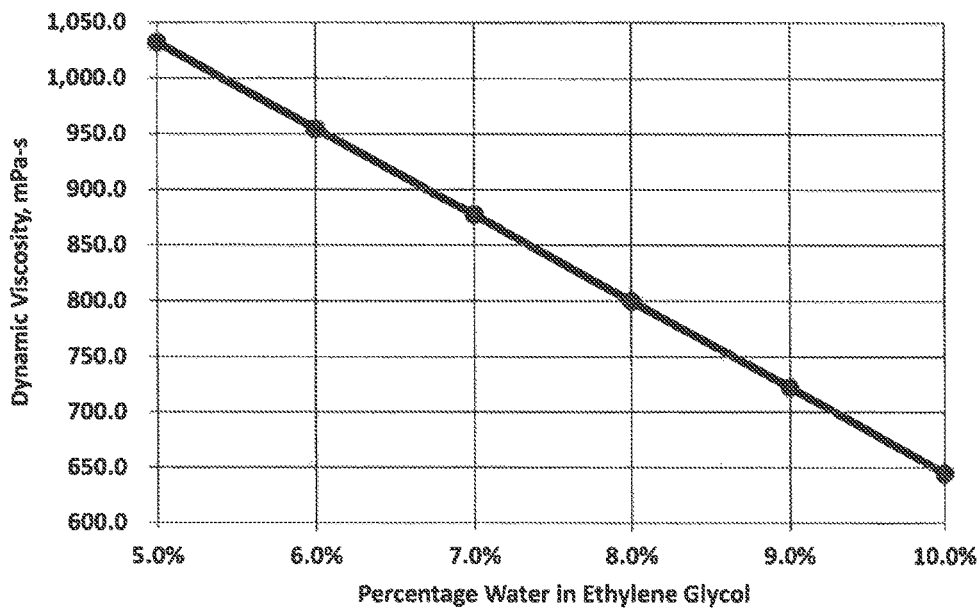
Figure 5  Dynamic Viscosity of Ethylene Glycol vs. Water Content at -40°C

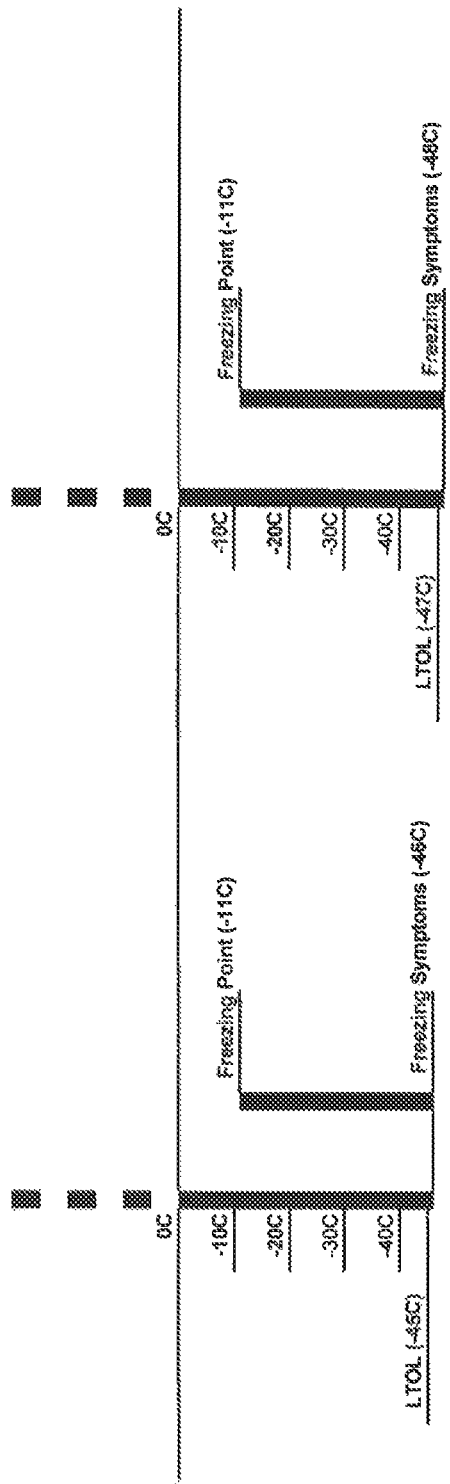

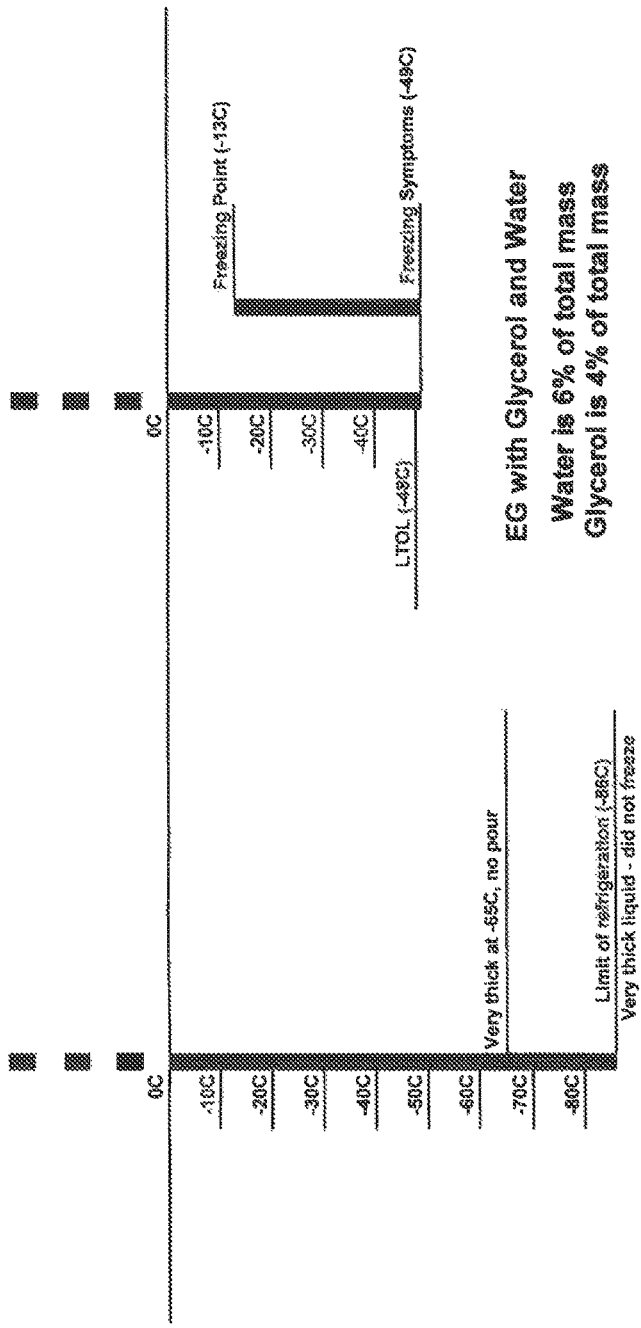

Freezing Point Intersections for EG Over 90%
From: *Glycols*, Union Carbide Corp., 1971

Freezing Point Intersections for EG Over 90%
From: MEGlobal *Ethylene Glycol Product Guide*, Rev Aug 2013

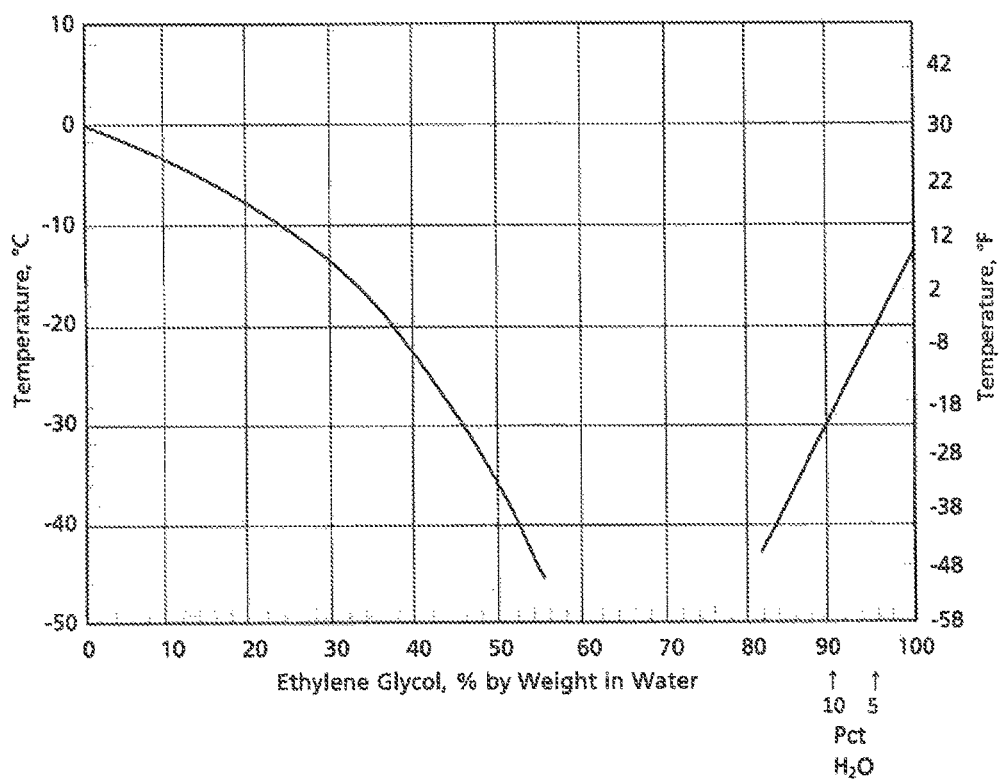

VERY LOW WATER HEAT TRANSFER FLUID WITH REDUCED LOW TEMPERATURE VISCOSITY

This application claims priority under 35 U.S.C. § 119(e) to U.S. Provisional Application No. 62/158,262 filed on May 7, 2015 and U.S. Provisional Application No. 62/158,338 filed on May 7, 2015, the entire contents of each of which are incorporated herein by reference.

FIELD OF THE INVENTION

The present invention is directed generally to very low water (VLW) heat transfer fluids, having atmospheric boiling points of between about 136° C. (about 277° F.) and about 154° C. (about 309° F.), preferably about 148° C. (about 300° F.), and low temperature operating limits (LTOLs) of −40° C. or below, comprised of ethylene glycol (EG) and zero or more additional polyhydric alcohols, such as diethylene glycol (DEG), triethylene glycol (TEG), tetraethylene glycol, 1,2 propanediol (PG), 1,3 propanediol (PDO), dipropylene glycol, tripropylene glycol, butylene glycol and glycerol, and further comprised of suitable corrosion inhibitors and water in a concentration by mass of between 5 and 10 percent. The heat transfer fluids are suitable for use in internal combustion engines as engine coolants and in other heat transfer applications. The VLW heat transfer fluids retain many of the features of non-aqueous heat transfer fluids, while providing substantially lower viscosities.

BACKGROUND

A non-aqueous heat transfer fluid is a heat transfer fluid formulated and used without any added water. ASTM International defines a non-aqueous coolant as "a glycol, diol, triol, or mixtures thereof, based heat transfer fluid containing less than 1.0% water when formulated and intended for final use without dilution with water." In contrast, an aqueous, water-glycol heat transfer fluid is typically comprised of about 50 percent water, together with one or more polyhydric alcohol freezing point depressants.

Water in its liquid state has excellent heat transfer characteristics. Even when the water is combined with a polyhydric alcohol freezing point depressant, such as EG, the heat capacity and thermal conductivity of the resulting aqueous heat transfer fluid remain preferable for heat transfer applications as long as the fluid is maintained in its liquid state. The challenge with a water-glycol heat transfer fluid that contains a substantial amount of water is keeping it in its liquid state at all times, under the high heat density conditions of modern engines and their Exhaust Gas Recirculation (EGR) coolers. Typical water-glycol heat transfer fluids are operated close to their boiling points because their boiling points are dominated by the large percentage of water that they contain. The atmospheric boiling point of a solution of 50% EG and 50% water is 107° C. (225° F.), a temperature that is easily reached in the coolant passages of an engine. A typical engine cooling system is pressurized to raise the boiling point of the coolant. The pressure, at least partly, comes from the presence of water vapor from boiling of coolant. Water vapor does not transfer heat well, which can result in local hot spots. Non-aqueous heat transfer fluids have atmospheric boiling points that are far higher than the temperatures at which they are typically used. Localized boiling can still produce vapor but the vapor condenses immediately into colder surrounding liquid coolant, avoiding the accumulation and pocketing of vapor. Use of a high boiling point non-aqueous coolant, by preventing the accumulation of vapor, keeps liquid in contact with hot metal at all times, giving improved heat transfer, as compared to coolants that contain water under conditions when water vapor is present.

U.S. Pat. No. 8,394,287 describes the use of a heat transfer fluid prepared by blending non-aqueous EG, the glycol having the highest thermal conductivity and lowest viscosity, with propylene glycol (PG) to reduce the toxicity of the EG and to reduce its low temperature operating limit. PG, alone among glycols, does not supercool, and does not itself exhibit the usual symptoms of freezing (the formation of nodules or crystals), but rather simply gets thicker, until it will not pour at all at temperatures below about −60° C. PG is very viscous at low temperatures but was effective for lowering the LTOL of the EG to which it was added.

U.S. Patent Publication No. 2015/0284617 describes the use of PDO and or DEG, both of which supercool, as a means to reduce the LTOL of non-aqueous EG. The PDO and/or DEG combinations, despite the fact that they themselves supercool, are effective in reducing the LTOL of the EG, while also reducing the viscosity at low temperatures, as compared to EG with PG combinations.

The freezing point of a glycol that exhibits supercooling is a temperature well above the temperature where solidification related to low temperatures initiates. The supercooling temperature range of a glycol that exhibits supercooling is a freezing range; it begins to freeze at a lower temperature and remains frozen to a higher temperature. The published freezing point of a glycol that exhibits supercooling is actually the melting point of the solidified mass after it freezes. The published freezing point for neat EG is −12° C., a temperature well above the temperature that is required to be reached in order to initiate freezing, EG starts to freeze at −22° C. The LTOL of an anhydrous glycol that exhibits supercooling is a temperature just above the onset of freezing symptoms. If the LTOL is never reached, operation within the supercooling range is stable, without nodules, crystals or solidification. The LTOL for EG at −21° C. (9° C. colder than its −12° C. freezing point) can be easily breached if the EG is exposed to common wintertime weather in many parts of the world. Specifications currently under consideration by ASTM International require that a non-aqueous engine coolant have an LTOL of −40° C. or lower.

Researchers are dissuaded from studying small fractions of included water (e.g. percentages in the 5% to 10% range) with ethylene glycol as a means to reduce the LTOL of ethylene glycol or the viscosity of ethylene glycol because the accepted bodies of information show freezing points that are high in temperature for water percentages under 10 percent. None of the published freezing point temperatures for EG, with water percentages in the 5% to 10% range, are colder than −30° C.

It would be desirable to have heat transfer fluids that would 1) have boiling points much higher than traditional water-glycol coolants, 2) have LTOLs as good as non-aqueous coolants, and 3) have low temperature viscosities reduced on the order of 50 percent as compared to non-aqueous coolants.

SUMMARY OF THE INVENTION

The present invention is directed generally to very low water (VLW) heat transfer fluids, having atmospheric boiling points of between about 136° C. (about 277° F.) and about 154° C. (about 309° F.), preferably about 148° C.

(about 300° F.), and low temperature operating limits (LTOLs) of −40° C. or below, comprised of ethylene glycol, an additional polyhydric alcohol component consisting of zero or more additional polyhydric alcohols, such as DEG, TEG, tetraethylene glycol, PG, PDO, dipropylene glycol, tripropylene glycol, or glycerol. The total mass of the additional polyhydric alcohols is between 0% and 30% of the total mass of the heat transfer fluid. The heat transfer fluid contains an additive component comprising suitable corrosion inhibitors, a buffer, a bitterant, and a dye. The additive component comprises between 2% and 7% of the mass of the heat transfer fluid. Water is included that comprises between 5% and 10% of the mass of the heat transfer fluid.

EG is the primary constituent of the heat transfer fluid because EG has the lowest viscosity as well as the highest thermal conductivity of all the polyhydric alcohols. The inventor unexpectedly discovered that, despite industry-accepted freezing point values, that show high freezing point temperatures when small amounts of water are included with EG, that in actuality, substantial LTOL improvements for EG are achieved when very small percentages of water are added to EG and still lower LTOLs can be achieved when the heat transfer fluid further comprises one or more other polyhydric alcohols. The VLW engine coolants of this invention can operate in the region of supercooling. A second unexpected discovery in the work of this invention is that the stability of operating in the supercooling range is remarkably enhanced by the inclusion of one or more polyhydric alcohols along with the ethylene glycol. The experience of this invention contravenes the ASTM International's definition of supercooling as "an unstable state in which an engine coolant exists as a liquid below its normal freezing point." The VLW heat transfer fluids of this invention are stable and suitable for use in internal combustion engines as engine coolants and in other heat transfer applications as well. The VLW heat transfer fluids of this invention provide boiling points that are much higher than traditional aqueous coolants and viscosities that are much reduced from those of non-aqueous heat transfer fluids.

BRIEF DESCRIPTION OF THE FIGURES

FIG. 3 is a chart of the freezing points and LTOLs for EG that is blended with water, wherein the mass of the water is between 5% and 10% of the mass of the mixture.

FIG. 4 is a chart of the boiling points of EG vs. water content in the 5% to 10% range.

FIG. 5 is a chart of the dynamic viscosities of EG vs. water content in the 5% to 10% range.

FIG. 6 is a chart showing the sub-0° C. temperature profile of a heat transfer fluid comprising EG, corrosion inhibitors, and water, with water being 6% of the total mass.

FIG. 7 is a chart showing the sub-0° C. temperature profile of a heat transfer fluid comprising EG, PDO, and water, with PDO being 4% and water being 6% of the total mass of the heat transfer fluid.

FIG. 8 is a chart showing the sub-0° C. temperature profile of a heat transfer fluid comprising EG, PDO, corrosion inhibitors, and water, with PDO being 14% and water being 6% of the total mass of the heat transfer fluid.

FIG. 9 is a chart showing the sub-0° C. temperature profile of a heat transfer fluid comprising EG, glycerol, and water, with glycerol being 4% and water being 6% of the total mass of the heat transfer fluid.

FIG. 12 is a chart of freezing points of aqueous EG solutions which shows that the conventional wisdom that in the range of 90% to 95% EG (5% to 10% water) where the freezing points are high for mixtures considered for a coolant fluid expected to operate at low temperatures (e.g. −40° C.).

DESCRIPTION OF THE INVENTION

The present invention is directed generally to very low water (VLW) heat transfer fluids, having atmospheric boiling points of between about 136° C. (about 277° F.) and about 154° C. (about 309° F.), preferably about 148° C. (about 300° F.), and low temperature operating limits (LTOLs) of −40° C. or below, comprised of ethylene glycol and zero or more additional polyhydric alcohols, such as DEG, TEG, tetraethylene glycol, PG, PDO, dipropylene glycol, tripropylene glycol, or glycerol, and further comprised of suitable corrosion inhibitors and water, the water being in a concentration by mass of between 5 and 10 percent of the mass of the heat transfer fluid. EG is the prime constituent of the heat transfer fluid as EG has the lowest viscosity and the highest thermal conductivity of all glycols. Small additions of water to the polyhydric alcohol constituent resulted in a much reduced viscosity as compared to non-aqueous mixtures. The inventor, however, unexpectedly discovered that, despite industry-accepted freezing point values showing high freezing point temperatures for small amounts of included water with EG, substantial LTOL improvements for EG are achieved when very small percentages of water are added to EG. Still lower LTOLs may be achieved when the heat transfer fluid further comprises one or more of the other polyhydric alcohols listed above. The VLW heat transfer fluids are suitable for use in internal combustion engines as engine coolants and in other heat transfer applications. The VLW heat transfer fluids retain many of the features of non-aqueous heat transfer fluids, while providing substantially lower viscosities.

Figure 1:
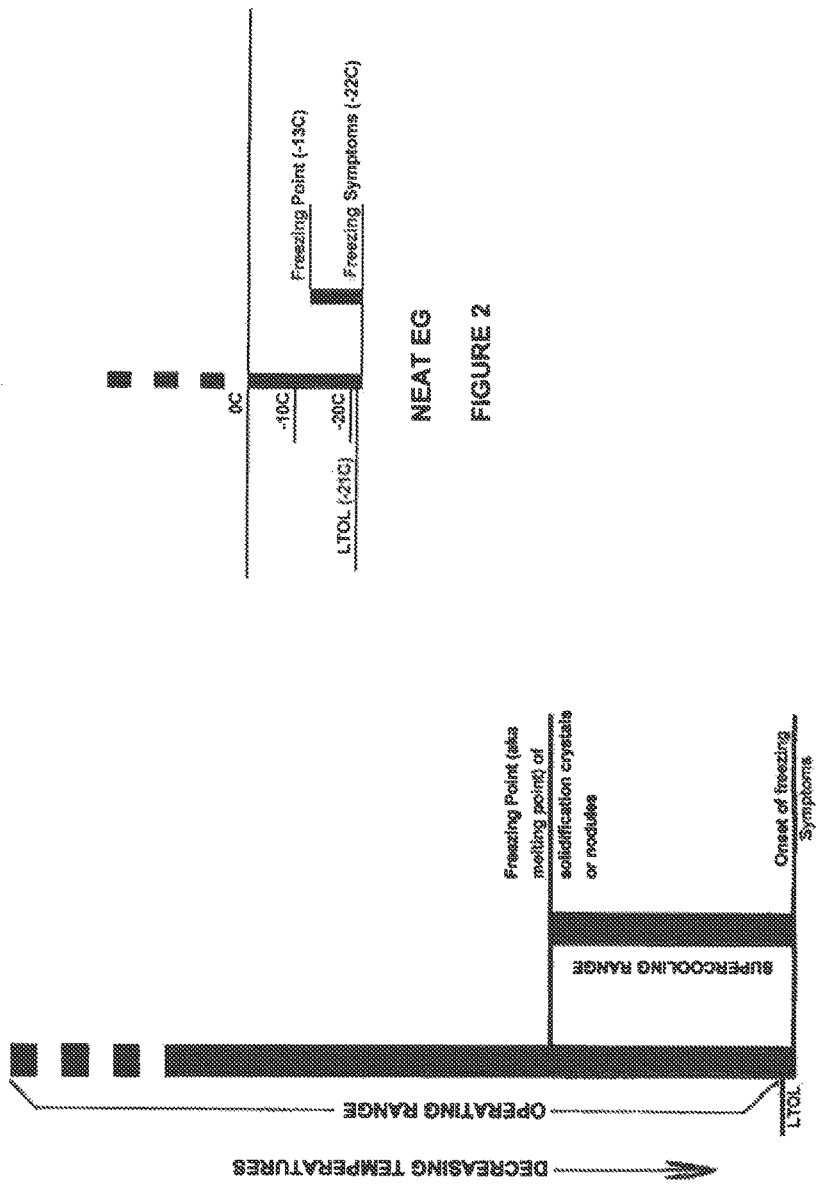
FIG. 1 is a chart that shows the general temperature profile of a glycol that exhibits supercooling.

Most glycols, with the exception of PG, have a supercooling range that is shown generally in FIG. 1. Glycols that have a supercooling range do not exhibit any of the physical characteristics of freezing, such as formation of solid crystals or nodules, until the fluid reaches a temperature well below the temperature where crystals or nodules will melt back into a liquid form. One could say that the supercooling temperature range of a glycol that exhibits supercooling is a freezing range; it begins to freeze at a lower temperature and remains frozen to a higher temperature. The freezing point of a glycol that exhibits supercooling is actually the melting point of the solidified mass after it freezes. Indeed, the temperature often referred to as the "freezing point" is usually determined using an apparatus that measures the melting point of solid material. The LTOL of an anhydrous glycol that exhibits supercooling is the temperature just above the onset of freezing symptoms. If the LTOL is never violated, operation within the supercooling range is stable, without nodules or solidification.

Figure 2:
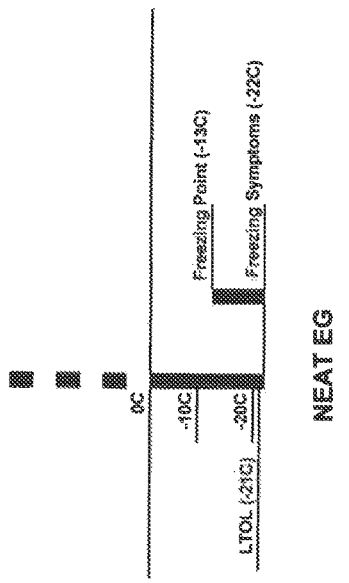
FIG. 2 is a chart that shows the sub-0° C. temperature profile of neat (i.e. 100%) EG.

As shown in FIG. 2, neat EG has a freezing point of −13° C. and a supercooling range that extends from −22° C. to −13° C. The LTOL of EG is about −21° C., i.e. about one degree warmer than −22° C., the temperature at which freezing symptoms initiate.

When water is added to an anhydrous glycol that supercools, the glycol-water mixture exhibits its own supercooling characteristics. The chart of FIG. 3 includes a plot of the published freezing points for EG/water mixtures with the mass of the water in the 5% to 10% range. The data for the freezing points is from page 13 of MEGlobal Ethylene Glycol Product Guide MEG-0002_MEG_Guide_Rev_Aug_2013. The curve for the low temperature operating limits vs. the heat transfer fluid having 5% to 10% water was developed from experimental data. The "region of supercooling" lies between the two curves. It was surprising that the distance between the two curves was so great. Contrary to the ASTM's characterization, that supercooling is "an unstable state in which an engine coolant exists as a liquid below its normal freezing point," the inventor found that operation within the region of supercooling is very stable. The inventor used the following method to test stability: mixing a small amount of water with the EG/water mixtures while the EG/water mixtures were at −40° C. The added water would instantly freeze. In all cases of EG/water mixtures having 6% water or more, the added (frozen) water simply dissolved or melted into the EG/water mixture. In the case of EG/water mixtures having 5% water, the added (frozen) water caused the growth of multiple frozen nodules and the onset of general freezing. A 2% addition of PDO to the EG/water mixture having 5% water was found to provide stability, avoiding and preventing the described problem. A 2% addition of any of the other non-EG polyhydric alcohols, i.e. DEG, TEG, tetraethylene glycol, PG, dipropylene glycol, tripropylene glycol, or glycerol, work to quell the instability as well. A VLW formulation having water in the 5% to 6% range requires at least a total of a 2% mass addition of one or more of the non-EG polyhydric alcohols to guarantee stability at −40° C.

FIGS. 4 and 5 show the boiling points and dynamic viscosities, respectively, of EG/water combinations wherein the water is in the 5% to 10% range. It should be noted that as the water content increases, the dynamic viscosity drops, which is desirable in a heat transfer fluid. At the same time, the boiling point drops, which is undesirable. In general, it appears that a water content of about 6% brings the viscosity to about half of a typical non-aqueous coolant, while a desirable boiling point is retained.

FIG. 6 is an embodiment of a fully formulated VLW heat transfer fluid wherein the water is 6% of the mass of the fluid. The corrosion inhibitors consist of, by mass, 0.5% sodium nitrate, 0.25% sodium molybdate, 0.33% azoles, 0.75% 2-EHA, and 0.38% potassium hydroxide. Its LTOL is −45° C. The LTOL of the heat transfer fluid can be lowered to −53° C. by adding 6% PDO.

In FIG. 7, the VLW heat transfer fluid comprises EG, PDO, and water, without additives. The percentages of PDO and of the water to the total mass of the heat transfer fluid are 4% and 6%, respectively. The PDO reduced the LTOL to −47° C.

The effect of a substantial amount of PDO in the VLW heat transfer fluid is shown in FIG. 8. The heat transfer fluid of FIG. 8 is a combination of EG, PDO, corrosion inhibitors, and water. The percentages of the PDO and of the water to the total mass of the heat transfer fluid are 14% and 6%, respectively. The extra PDO, combined with the small inclusion of water, stopped any formation of nodules or crystals, regardless of temperature. This combination does not supercool at all. At very low temperatures the mixture simply becomes increasingly viscous, barely pourable at −65° C. Depending upon the application, the percentage of the other non-EG polyhydric alcohols, i.e. DEG, TEG, tetraethylene glycol, PG, PDO, dipropylene glycol, tripropylene glycol, or glycerol, to be used in a formulation for a heat transfer fluid varies between 0% and 30%.

When glycerol was combined with EG and water, the VLW heat transfer fluid exhibited a significantly lower LTOL. FIG. 9 is a mixture of EG, glycerol, and water wherein the percentages of the glycerol and of the water to the total mass of the heat transfer fluid are 4% and 6%, respectively, with a resulting LTOL of −48° C.

Figure 10:
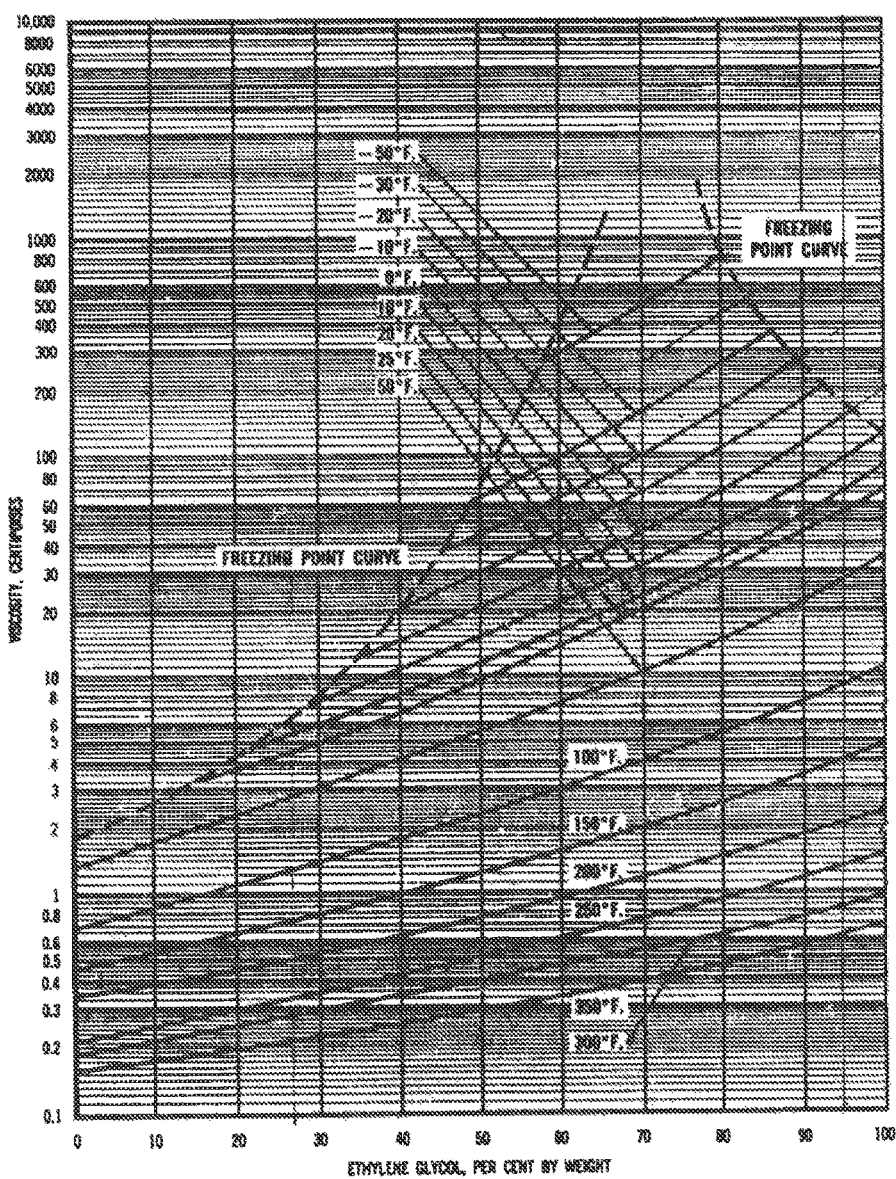
FIGS. 10 and 11 are charts that show the viscosities of a wide range of EG/water concentrations for a wide range of temperatures. Of particular interest are the values shown at concentrations in the range of 90% to 95% EG and the freezing point curve intersections for low temperatures in that concentration range.
Figure 11:
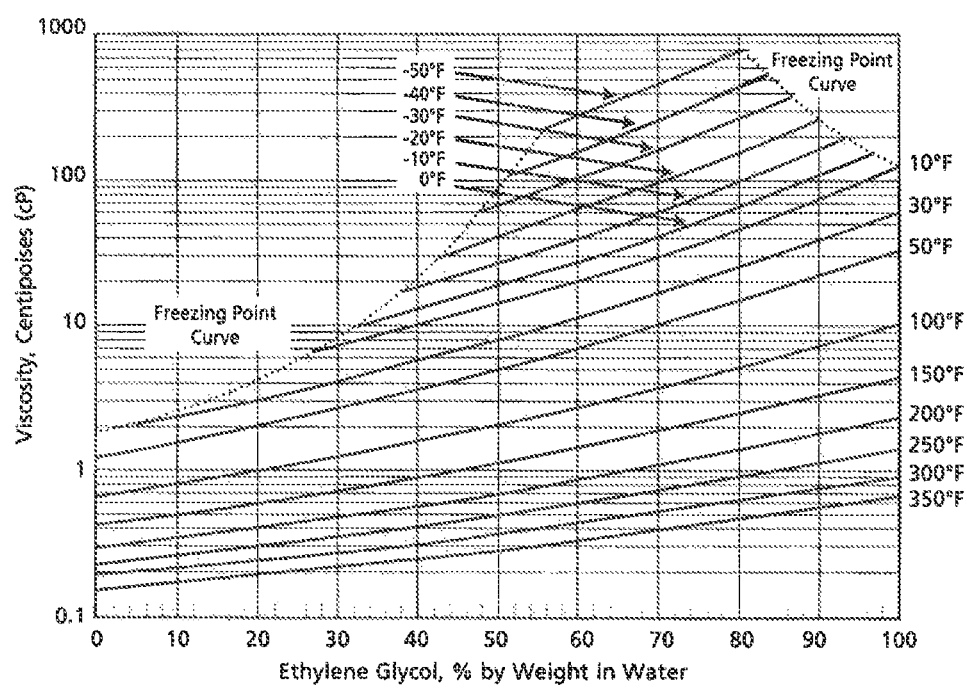

Conventional wisdom taught against the use of highly concentrated EG/water mixtures as engine coolants at low temperatures (e.g. −40° C.) and certainly in the 5% to 10% water range (90% to 95% EG range). FIGS. 10 and 11 are Viscosities of Aqueous Ethylene Glycol Solutions vs. EG Concentration presented by Union Carbide Inc, in 1971 and by MEGlobal in 2013, respectively. In the upper right hand section of each chart there is a "freezing point curve", beyond which there is no plotted data, indicating that mixtures at that location are frozen. The technology of this invention, however, operates within the defined frozen region successfully and with stability.

FIG. 12 shows Freezing Points of Aqueous Ethylene Glycol Solutions vs. EG concentration, presented by MEGlobal in 2013. The EG concentration between 90% and 95% shows freezing temperatures high enough (−30° C. to about −22° C.) to dissuade researchers from exploring fluids in this range as candidates for engine coolants needing to withstand temperatures as cold as or colder than −40° C.

Because a VLW heat transfer fluid contains so little water, the anti-corrosion additives must be able to dissolve in the included polyhydric alcohols. Corrosion inhibitor additives that may be used in the heat transfer fluid include nitrates, such as sodium nitrate, molybdates, such as sodium molybdate, azole compounds, such as tolyltriazole (TT), hydrogenated tolyltriazole (THT), butylbenzotriazole (BBT), or mixtures thereof, and one or more organic acid corrosion inhibiting agents, such as 2-ethylhexanoic acid and neodecanoic acid. Combinations of these corrosion inhibitors may also be used. Additionally, potassium or sodium hydroxide may be suitably added to raise the pH of the heat transfer fluid to a desired level. The corrosion inhibitor additives may be present individually in concentrations of about 0.05% to about 3% by mass.

There are various benchmarks that are important for VLW heat transfer fluids used as engine coolants. The most important is an LTOL of −40° C., as the temperatures at all times on most of the world's surface do not reach temperatures that cold. The water in the VLW heat transfer fluids acts as a means to both lower the LTOL and reduce the viscosity, both very positive attributes. The extent to which water may be added, however, is very limited. Preferably, to maintain a fluid's boiling point at 148° C. (about 300° F.), the water content should be close to 6 mass percent.

As will be recognized by those skilled in the art based on the teachings herein, numerous changes and modifications may be made to the above-described embodiments of the present invention without departing from its spirit or scope. Accordingly, the detailed description of specific embodiments of the invention is to be taken in an illustrative rather than a limiting sense.

What is claimed is:

1. A method for cooling an internal combustion engine having a circulating liquid engine cooling system using an ethylene glycol-based heat transfer fluid, said method comprising the steps of:
    a) formulating a heat transfer fluid comprising (1) ethylene glycol, (2) an additional polyhydric alcohol component, wherein the total mass of the additional polyhydric alcohol component is greater than 0% and less than or equal to 30% of the total mass of the heat transfer fluid, (3) an additive component comprised of at least one of the following additives: a buffer, corrosion inhibitor, defoamer, dye, bitterant, scale inhibitor, surfactant, or chelant, wherein the additive component is between 2% and 7% of the total mass of the heat transfer fluid, and (4) water, wherein the water comprises between 5% and 10% of the total mass of the heat transfer fluid, and wherein the heat transfer fluid has an atmospheric boiling point above 136° C., a dynamic viscosity less than 1100 mPa-s at minus 40° C., and a stable low temperature operating limit less than minus 40° C.; and
    b) substantially filling the cooling system of the internal combustion engine with the heat transfer fluid such that the heat transfer fluid absorbs heat that is produced by the internal combustion engine and releases the absorbed heat to a lower temperature environment.

2. The method of claim 1 wherein the additional polyhydric alcohol component is selected from the group consisting of diethylene glycol, triethylene glycol, tetraethylene glycol, 1,2 propanediol, 1,3 propanediol, dipropylene glycol, tripropylene glycol, butylene glycol, glycerol, and combinations thereof.

3. The method of claim 1 wherein the heat transfer fluid has an atmospheric boiling point above 146° C., a dynamic viscosity less than 1000 mPa-s at minus 40° C., and a stable low temperature operating limit less than minus 45° C., wherein the additional polyhydric alcohol component consists of 1,3 propanediol having a mass that is between 2% and 6% of the total mass of the heat transfer fluid, and wherein the water comprises between 5.5% to 6.5% of the total mass of the heat transfer fluid.

* * * * *